US012075256B2

(12) United States Patent
Kalia et al.

(10) Patent No.: US 12,075,256 B2
(45) Date of Patent: Aug. 27, 2024

(54) DISTRIBUTED FAULT-TOLERANT STATE STORE FOR VIRTUALIZED RADIO ACCESS NETWORKS

(71) Applicant: Microsoft Technology Licensing, LLC, Redmond, WA (US)

(72) Inventors: Anuj Kalia, Bellevue, WA (US); Ilias Marinos, Cambridge (GB); Daehyeok Kim, Redmond, WA (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 752 days.

(21) Appl. No.: 17/323,653

(22) Filed: May 18, 2021

(65) Prior Publication Data

US 2022/0377563 A1   Nov. 24, 2022

(51) Int. Cl.
*H04W 16/02*   (2009.01)
*H04W 28/088*   (2023.01)

(52) U.S. Cl.
CPC ......... *H04W 16/02* (2013.01); *H04W 28/088* (2023.05)

(58) Field of Classification Search
None
See application file for complete search history.

(56) References Cited

U.S. PATENT DOCUMENTS

| 10,637,544 | B1 * | 4/2020 | Shattil | .................. | H04B 7/0691 |
| 2020/0036414 | A1 * | 1/2020 | Shattil | .................. | H04B 1/0003 |
| 2020/0065269 | A1 | 2/2020 | Balasubramani et al. | | |
| 2022/0159785 | A1 * | 5/2022 | Foukas | .................. | H04W 24/02 |
| 2023/0371029 | A1 * | 11/2023 | Yamamoto | ............ | H04L 1/1861 |

FOREIGN PATENT DOCUMENTS

| CN | 106488497 A | 3/2017 |
| EP | 3068157 A1 | 9/2016 |

OTHER PUBLICATIONS

"International Search Report and Written Opinion Issued in PCT Application No. PCT/US22/026252", Mailed Date: Jul. 22, 2022, 11 Pages.

* cited by examiner

*Primary Examiner* — Nguyen H Ngo
(74) *Attorney, Agent, or Firm* — ARENTFOX SCHIFF LLP

(57) ABSTRACT

Described are examples for providing a distributed fault-tolerant state store for a virtualized base station. In an aspect, a first server at a datacenter may perform physical layer processing for at least one virtualized base station. While performing the physical layer processing, the first server may generate inter-slot physical layer state data during a first slot. The inter-slot physical layer state data is to be used in a subsequent slot. The first server may periodically transmit the inter-slot physical layer state data to one or more other servers of the plurality of servers within the datacenter. One of the other servers may take over the physical layer processing for the at least one virtualized base station based on the inter-slot physical layer state data, for example, in response to a fault at the first server or a migration of the at least one virtualized base station.

20 Claims, 6 Drawing Sheets

DISTRIBUTED FAULT-TOLERANT STATE STORE FOR VIRTUALIZED RADIO ACCESS NETWORKS

BACKGROUND

A radio access network (RAN) may provide multiple user devices with wireless access to a network. The user devices may wirelessly communicate with a base station, which forwards the communications towards a core network. Conventionally, a base station in the RAN is implemented by dedicated processing hardware (e.g., an embedded system) located close to a radio unit including antennas. The base station may perform lower layer processing including physical (PHY) layer and media access control (MAC) layer processing for one or more cells. There may be costs associated with deploying dedicated processing hardware for each base station in a RAN, particularly for a RAN including small cells with relatively small coverage areas. Additionally, the dedicated processing hardware may be a single point of failure for the cell.

A virtualized radio access network may utilize an edge datacenter with generic computing resources for performing RAN processing for one or more cells. That is, instead of performing PHY and MAC layer processing locally on dedicated hardware, a virtualized radio access network may forward radio signals from the radio units to the edge datacenter for processing and similarly forward signals from the edge datacenter to the radio units for wireless transmission. In one specific example, cloud-computing environments can be used to provide mobile edge computing (MEC) where certain functions of a mobile network can be provided as workloads on nodes in the cloud-computing environment. In MEC, a centralized unit (CU) can be implemented in a back-end node, one or more distributed units (DUs) can be implemented in intermediate nodes, and one or more radio units (RUs) may be deployed remotely, for example, on a rooftop. The DUs, which can be deployed at edge serves and provide media access control (MAC) and at least some physical (PHY) layer processing of a base station or other RAN node of the mobile network. The DUs may also provide radio link control (RLC) layer processing. Radio units (RUs) may perform basic PHY layer processing such as fast Fourier transform (FFM) at an antenna, which may be deployed, for example, on a rooftop. RUs can communicate with the CU via one or more DUs. In an example, the CUs can provide higher network layer functionality for the RAN, such as radio resource control (RRC) or packet data convergence protocol (PDCP) layer functions. The RUs can facilitate access to the CU for various downstream devices, such as user equipment (UE), Internet-of-Things (IoT) devices, etc.

Because the edge datacenter utilizes generic computing resources, a virtualized RAN may provide scalability and fault tolerance for base station processing. For example, the edge datacenter may assign a variable number of computing resources (e.g., servers) to perform PHY layer processing for the radio units associated with the edge datacenter based on a workload. Further, a virtualized RAN may perform processing at a different server if a fault is detected at a server currently performing the processing.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a device for operating a virtualized base station is provided that includes a memory storing one or more parameters or instructions for deploying workloads in the cloud-computing environment, and at least one processor coupled to the memory. The at least one processor is configured to generate inter-slot physical layer state data for at least one virtualized base station at a first server that performs physical layer processing for the at least one virtualized base station during a first slot. The inter-slot physical layer state data is to be used in a subsequent slot. The at least one processor is configured to periodically transmit the inter-slot physical layer state data to one or more other servers within a datacenter.

In another example, a computer-implemented method for operating a virtualized base station is provided. The method includes generating inter-slot physical layer state data for at least one virtualized base station at a first server that performs physical layer processing for the at least one virtualized base station during a first slot. The inter-slot physical layer state data is to be used in a subsequent slot. The method includes periodically transmitting the inter-slot physical layer state data to one or more other servers within a datacenter.

In another example, a datacenter for operating virtualized base stations is provided. The datacenter includes a plurality of servers for performing physical layer processing, each respective server includes a memory storing one or more parameters or instructions for operating a virtualized base station and at least one processor coupled to the memory. The at least one processor is configured to perform physical layer processing for at least one virtualized base station. The at least one processor is configured to generate inter-slot physical layer state data for the at least one virtualized base station during a first slot. The inter-slot physical layer state data is to be used in a subsequent slot. The at least one processor is configured to periodically transmit the inter-slot physical layer state data to one or more other servers of the plurality of servers within the datacenter.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
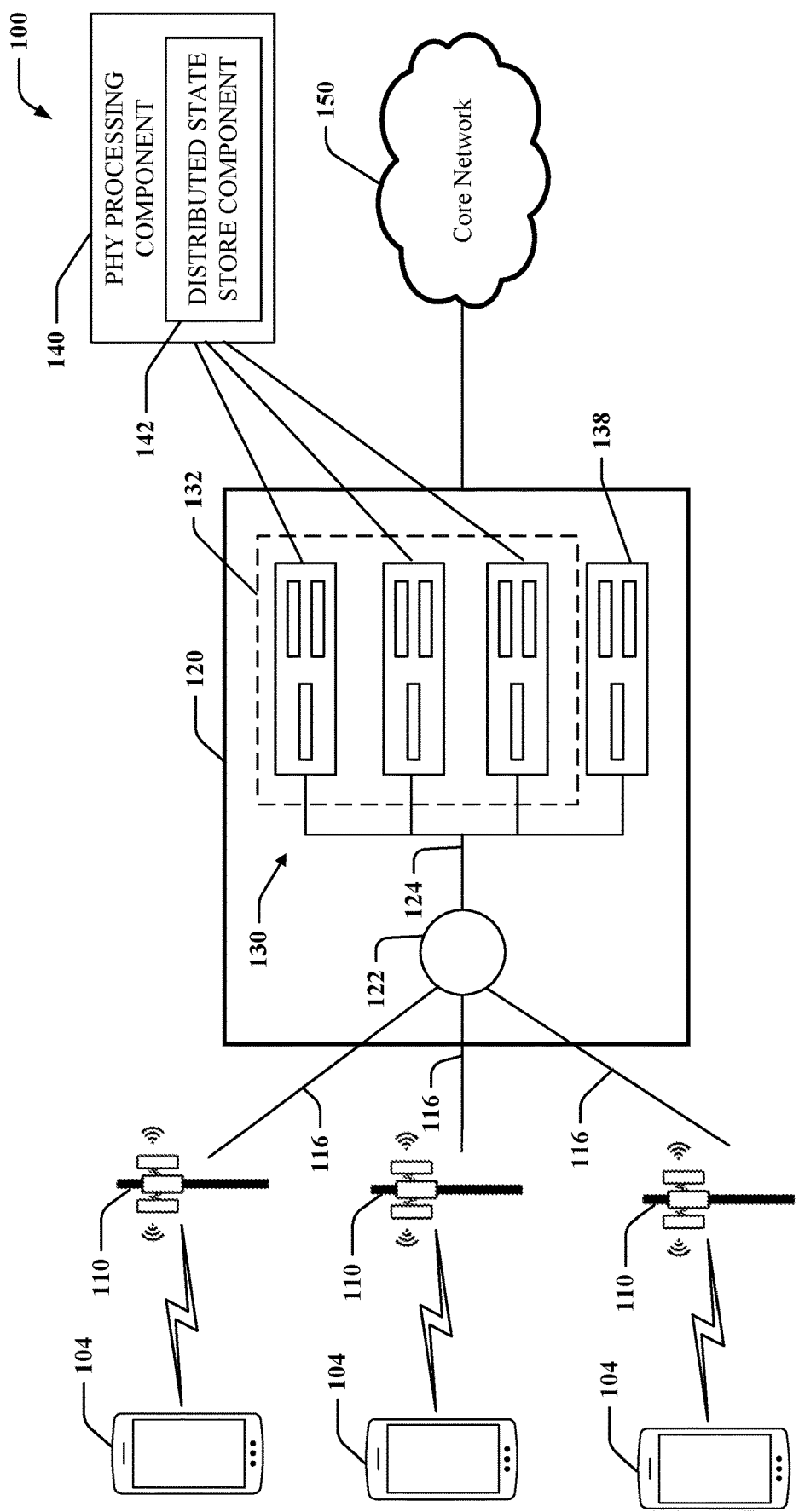
FIG. 1 is a diagram of an example of an architecture for a virtualized radio access network (RAN), in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to providing a fault-tolerant distributed state store for virtualized radio access networks (RANs). In some aspects, a server that is performing physical layer processing for a virtualized base station may generate inter-slot physical layer state data for the virtualized base station. The server may periodically transmit the inter-slot physical layer state data to one or more other servers within a datacenter. The servers may be connected with high-speed wired connections (e.g., 100 Gigabits per second (Gbps) Ethernet) that allow transfer of the inter-slot physical layer state data within a slot. Accordingly, the inter-slot physical layer state data may be distributed among the servers within the datacenter. The inter-slot physical layer state data may allow migration and/or recovery of PHY layer processing on a different server.

The inter-slot physical layer state data may be state data that is used for physical layer processing that is valid over at least two slots. For example, the inter-slot physical layer state data may be valid during a first slot in which the data is created and in a second slot in which the state data is used or consumed. Examples of inter-slot state data include uplink control information (UCI) such as a channel quality indicator (CQI), a precoding matrix indicator (PMI), and rank indicator (RI). Other examples of inter-slot state data include UE specific measurements of signal to noise ratio (SNR) and counters/timers for discontinuous reception (DRX). In some implementations, beamforming weights may be included in inter-slot state data and may be compressed. The inter-slot physical layer state data may be contrasted with intra-slot state data that is valid in only one slot. Physical layer processing may generate large amounts of intra-slot state data such as channel estimates, modulation symbols, transmission matrices, etc. Transferring intra-slot state data between servers may not be feasible due to the quantity of data produced within a short time period. For example, by the time the intra-slot state data is transferred to another server, the slot may be over. Inter-slot state data may include information such as hybrid automatic repeat request (HARM) retransmission buffers, beamforming information, and channel quality information (CQI). The amount of inter-slot state data may be relatively smaller than the amount of intra-slot state data. Additionally, because the inter-slot state data is used in a second slot, the inter-slot state data is valid for a longer period of time. Accordingly, by storing inter-slot state data, a fault-tolerant state store may provide for transfer or recovery of PHY layer processing between slots.

Figure 3:
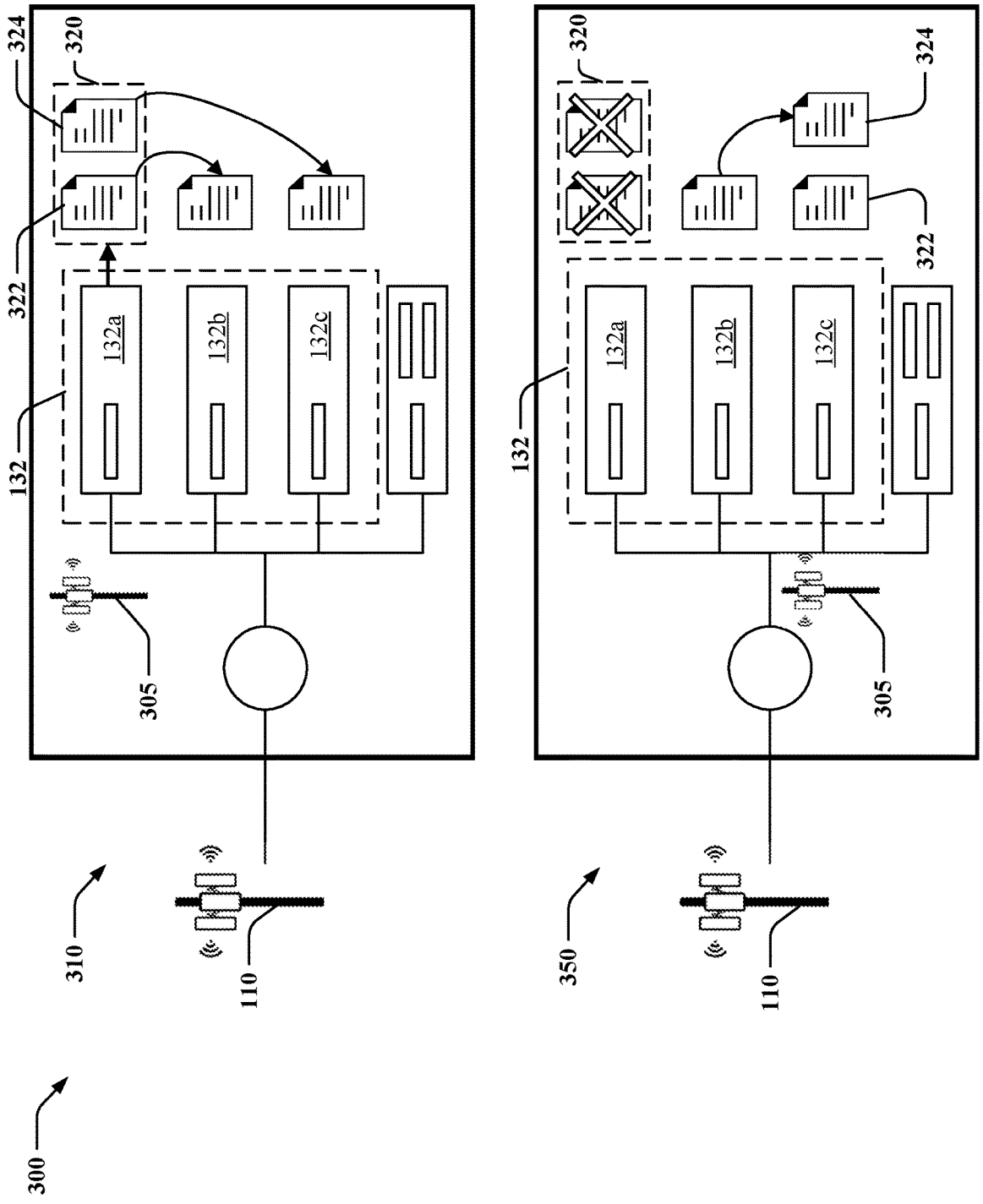
FIG. 3 is a diagram of creating and using an example distributed fault-tolerant state store for a virtualized RAN, in accordance with aspects described herein.
Figure 4:
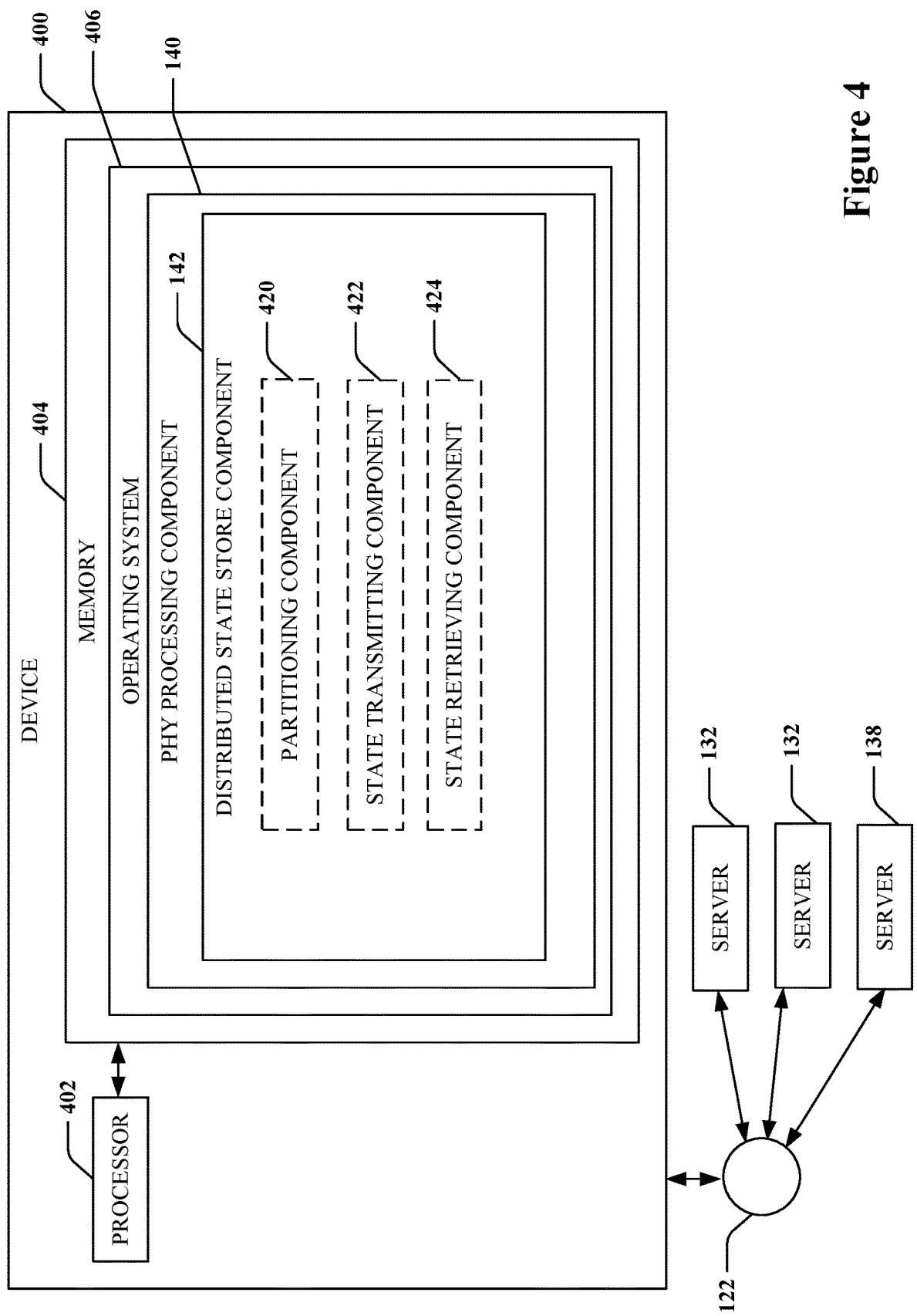
FIG. 4 is a schematic diagram of an example of a device for providing a distributed fault-tolerant state store for a virtualized RAN, in accordance with aspects described herein.
Figure 5:
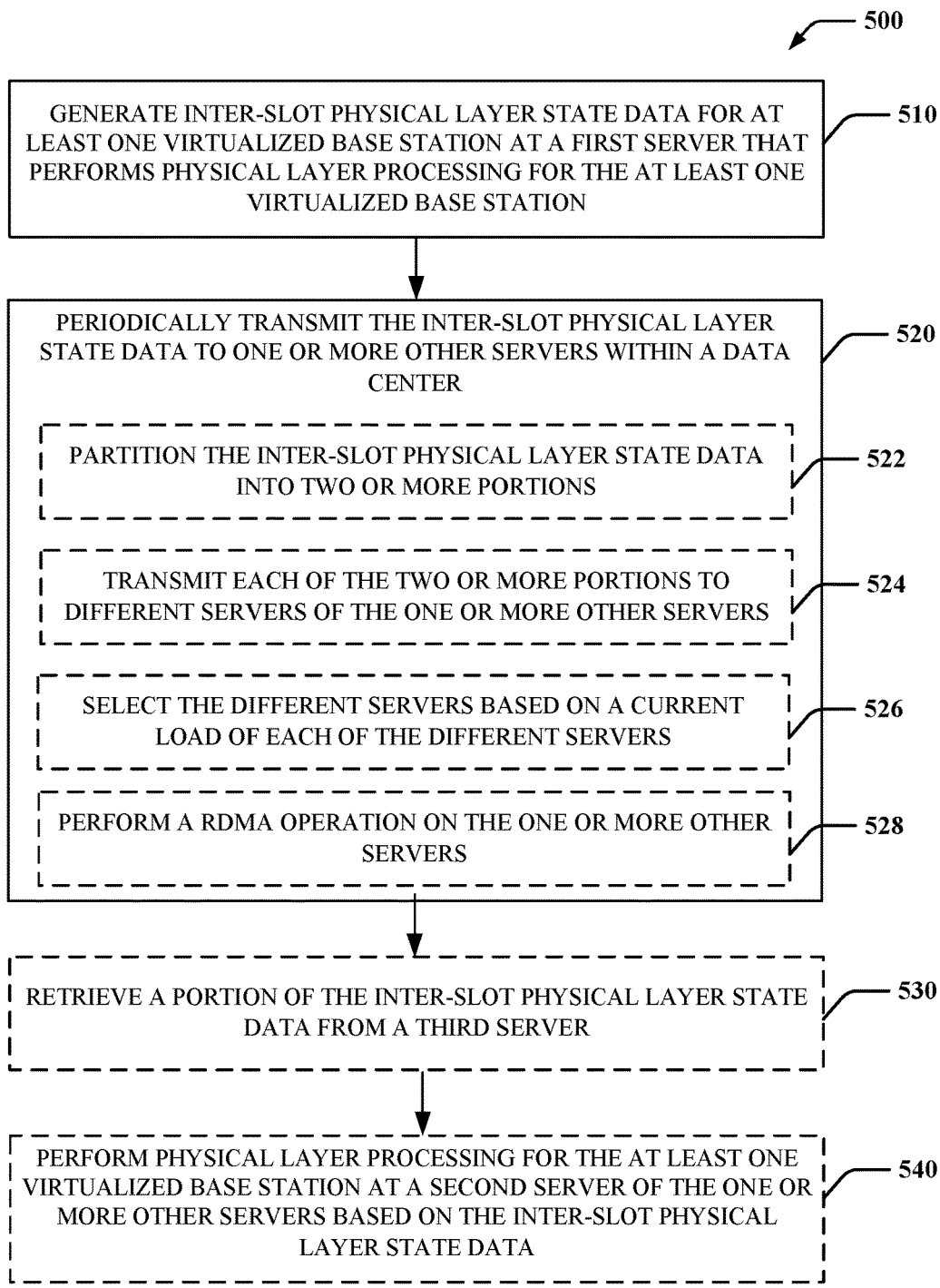
FIG. 5 is a flow diagram of an example of a method of providing a distributed fault-tolerant state store for a virtualized RAN, in accordance with aspects described herein.

Turning now to FIGS. 1-6, examples are depicted with reference to one or more components and one or more methods that may perform the actions or operations described herein, where components and/or actions/operations in dashed line may be optional. Although the operations described below in FIG. 5 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a diagram of an example of an architecture for a virtualized RAN 100. The RAN 100 may provide access for user equipment (UEs) 104. The virtualized RAN 100 may include radio units 110, an edge datacenter 120, and a core network 150.

The radio units 110 may include antennas configured to transmit and/or receive radio frequency (RF) signals. In some implementations, the radio units 110 may include RF processing circuitry. For example, the radio units 110 may be configured to convert the received RF signals to baseband samples and/or convert baseband samples to RF signals. The radio units 110 may be connected to the edge datacenter 120 via front-haul connections 116. The front-haul connections 116 may be wired connections such as fiber optic cables.

The edge datacenter 120 may include one or more switches 122, connections 124, and a plurality of servers 130. In an aspect, the plurality of servers 130 may include PHY servers 132 and a higher layer server 138. The servers may be generic computing resources. For example, the servers may be hardware servers or virtual servers. In some implementations, PHY layer processing may be more resource intensive than higher layer processing. For example, the MAC layer, a radio link control (RLC) layer, and a radio resource control (RRC) layer may be executed on a single server 138 whereas multiple PHY servers 132 may perform PHY layer processing. The plurality of servers 130 may be connected to the switch 122 and to each other via connections 124, which may be wired connections such as Ethernet. In an aspect, the links between the radio units 110 and the plurality of servers 130 may include only wired connections. That is, the links may exclude wireless connections to avoid a wireless protocol stack. Further, wired connections 116 and 124 may provide reliability and/or allow use of direct memory access (DMA) operations.

In an aspect, each PHY server 132 includes a PHY processing component 140 configured to perform PHY layer processing for at least one virtualized base station. For instance, a virtualized base station may provide one or more cells from a radio unit 110. In an aspect, the PHY layer processing may be performed according to a functional application platform interface (FAPI) protocol. For instance the Small Cell Forum publishes a suite of FAPI protocols including a PHY API that defines control between the MAC layer and the PHY layer. The FAPI protocols also include an RF and Digital Front End Control API, which defines an interface between the radio units 110 and the edge datacenter 120.

The PHY layer processing may include forward error correction (FEC) coding/decoding of the transport channels, interleaving, rate matching, mapping onto physical channels, modulation/demodulation of physical channels, and MIMO antenna processing. Modulation may include mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates may be used to determine the coding and modulation scheme, as well as for spatial processing. The channel estimate may be derived from a reference signal and/or channel condition feedback transmitted by a user device 104. Each spatial stream may then be provided to a different antenna of the radio unit 110.

The PHY processing component 140 includes a distributed state store component 142 configured to periodically transmit inter-slot physical layer state data to one or more other servers within the datacenter 120. That is, each PHY server 132 may execute a local version of the distributed state store component 142. The local version of the distributed state store component 142 may transmit the inter-slot state data generated during PHY processing at the local PHY server 132 to one or more other PHY servers. The local version of the distributed state store component 142 may also receive inter-slot state data generated at other PHY servers. In some implementations, the distributed state store component 142 may provide a portion of the stored inter-slot state data to another PHY server.

Figure 2:
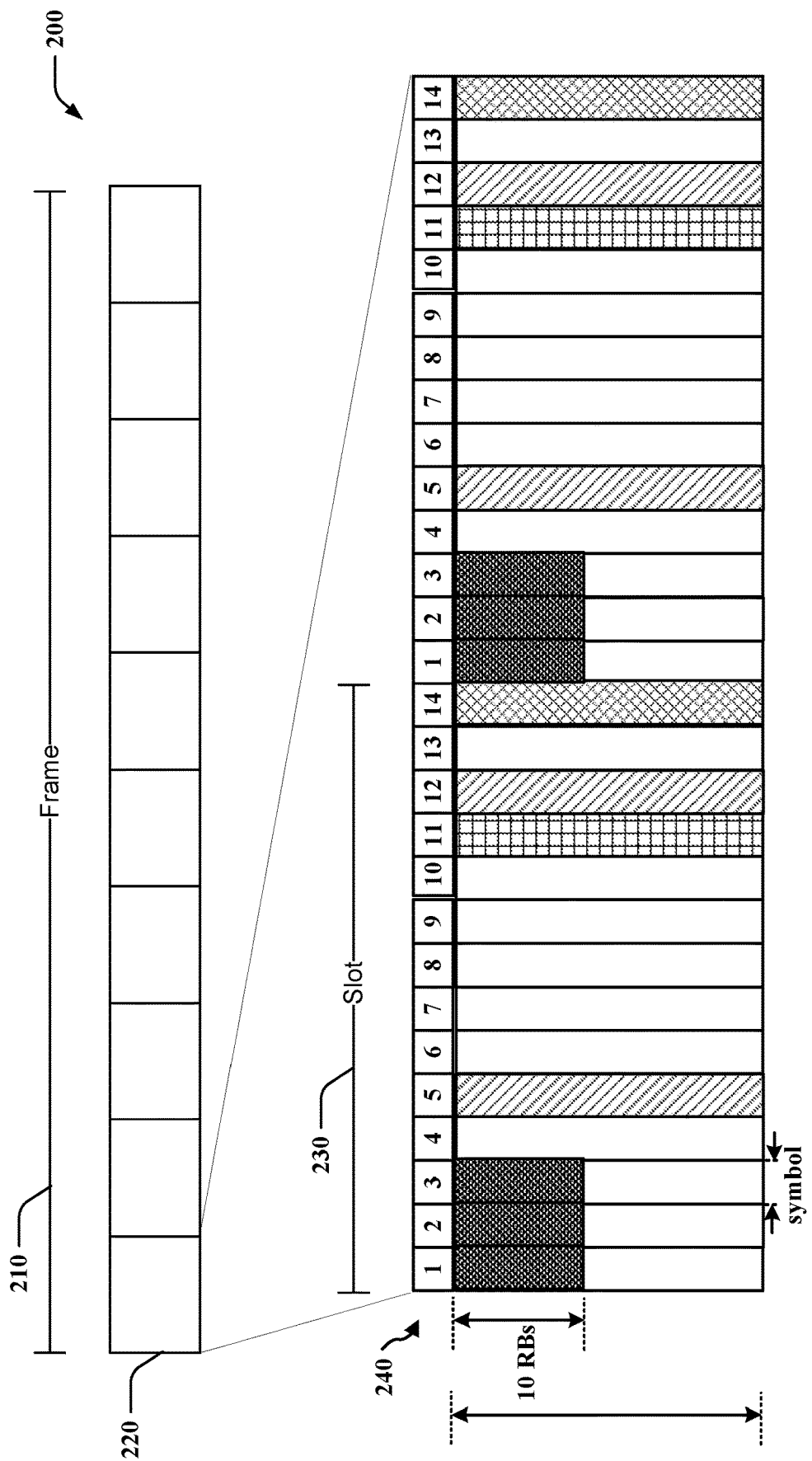
FIG. 2 is a diagram of an example of a frame structure for wireless communications, in accordance with aspects described herein.

FIG. 2 is a diagram of an example of a frame structure 200 for wireless communications. A frame 210 (10 ms) may be divided into 10 equally sized subframes 220 (1 ms). Each subframe may include one or more time slots 230. Each slot 230 may include 7 or 14 symbols, depending on the slot configuration. For instance, for slot configuration 0 (as illustrated), each slot may include 14 symbols, and for slot configuration 1, each slot may include 7 symbols. The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing.

A resource grid 240 may be used to represent the frame structure. Each time slot 230 includes a resource block (RB) (also referred to as physical RBs (PRBs)) that extends 12 consecutive subcarriers. The resource grid is divided into multiple resource elements (REs). The number of bits carried by each RE depends on the modulation scheme.

In an aspect, PHY layer processing may be performed on a slot basis. For example, the FAPI protocols may define requests of downlink messages to transmit and indications for uplink received messages. The PHY layer may map the messages to resources within the slot.

FIG. 3 is a diagram 300 of creating and using an example distributed fault-tolerant state store for a virtualized RAN. During a creating stage 310, a first PHY server 132a may perform PHY processing for a virtualized base station 305. For example, the first PHY server 132a may communicate with the RU 110. The first PHY server 132a may generate inter-slot state data 320 including a first portion 322 and a second portion 324. The first PHY server 132a may transmit the first portion 322 to the second PHY server 132b and transmit the second portion 324 to the third PHY server 132c. During a usage stage 350 (e.g., in response to a migration or fault) the third PHY server 132c may begin PHY processing for the virtualized base station 305. For example, the first PHY server 132a may fail and the state data 320 stored at the first PHY server 132a may be unavailable. The switch 122 may cause the third PHY server 132c to communicate with the RU 110. The third PHY server 132c may already have the second portion 324 of the inter-slot state data 320. The second PHY server 132b may transmit the first portion 322 of the inter-slot state data 320 to the third PHY server 132c. For example, the third PHY server 132c may request the first portion 322, or a control component that triggers the change may request the second PHY server 132b to transmit the first portion 322. In either case, the third PHY server 132c may receive the first portion 322 and perform the PHY processing based on the inter-slot state data 320.

In some implementations, the first PHY server 132a may partition the inter-slot state data 320 into two or more portions 322 and 324. For example, the first PHY server 132a may perform hash partitioning on the inter-slot state data 320. Each state element has a key. For example, per-UE state data may be keyed by a unique ID of the UE. Beamforming weights can be keyed by antenna/port ID. A hashing algorithm assigns each key to one of the other PHY servers 132. For example, the server ID may be generated based on a formula such as server_id=hash(key) modulo number_of_servers. The first PHY server 132a may combine all the state data destined for a particular server and transmit the portion of inter-slot state data in bulk. In some implementations, the number of servers may be selected based on a current load of each of the different servers. For example, the first PHY server 132a may select one or more servers having a load less than a threshold to receive the inter-slot state data because one of those servers may be most likely to be assigned the PHY processing of the first PHY server 132a in case of a fault.

Transmitting the state information between PHY servers 132 may rely on fast and reliable datacenter transport. For example, in some implementations, the first PHY server 132a may utilize remote direct memory access (RDMA) to write directly to the memory of the other PHY servers 132 with minimal additional processing. In some implementations, the first PHY server 132 may utilize user datagram protocol (UDP) to transmit the state data. Within an edge datacenter, UDP can be made lossless using Ethernet priority flow control. As another alternative, if a portion of state data is to be transmitted to multiple servers to increase fault tolerance, a multicast transmission protocol may be used.

FIG. 4 is a schematic diagram of an example of a device 400 (e.g., a computing device) for providing a distributed fault-tolerant state store for a virtualized RAN. The device 400 may be an example of a PHY server 132. The device 400 resides within a datacenter (e.g., the datacenter 120). The datacenter may be an edge datacenter. The device 400 is connected to other servers within the datacenter via the switch 122 and wired connections. In particular, the device 400 is connected to a higher layer server 138 and at least one other PHY server 132.

In an example, device 400 can include a processor 402 and/or memory 404 configured to execute or store instructions or other parameters related to providing an operating system 406, which can execute one or more applications or processes, such as, but not limited to, at least one of a PHY processing component 140 for generating inter-slot physical layer state data for at least one virtualized base station at a first server that performs physical layer processing for the at least one virtualized base station or a distributed state store component 142 for periodically transmitting the inter-slot physical layer state data to one or more other servers within a datacenter. For example, processor 402 and memory 404 may be separate components communicatively coupled by a bus (e.g., on a motherboard or other portion of a computing device, on an integrated circuit, such as a system on a chip (SoC), etc.), components integrated within one another (e.g., processor 402 can include the memory 404 as an on-board component), and/or the like. Memory 404 may store instructions, parameters, data structures, etc. for use/execution by processor 402 to perform functions described herein.

In an example, the distributed state store component 142 may optionally include one or more of a partitioning component 420 configured to partition the inter-slot physical layer state data into two or more portions, a state transmitting component 422 configured to transmit each of the two or more portions to different servers of the one or more other servers, or a state retrieving component 424 configured to retrieve a portion 322, 324 of the inter-slot physical layer state data from a third server prior to performing the physical layer processing.

FIG. 5 is a flow diagram of an example of a method 500 for providing a distributed fault-tolerant state store for a virtualized RAN, in accordance with aspects described herein. For example, the method 500 can be performed by a device 400 and/or one or more components thereof to provide a distributed fault-tolerant state store for a virtualized RAN.

At block 510, the method 500 includes generating inter-slot physical layer state data for at least one virtualized base station at a first server that performs physical layer processing for the at least one virtualized base station during a first slot. In an example, the PHY processing component 140, e.g., in conjunction with processor 402, memory 404, and operating system 406, can generate the inter-slot physical layer state data for at least one virtualized base station at the first server 132a that performs physical layer processing for the at least one virtualized base station 305 during a first slot 230. For example, the PHY processing component 140 may perform PHY layer processing. In some implementations, the PHY layer processing is based on FAPI messages. For example, for downlink transmissions, the PHY processing component 140 may receive a MAC layer message from the higher layer server 138, process the MAC layer message to generate samples, and transmit the samples to a radio unit 110. For uplink transmissions, the PHY processing component 140 may receive samples from the radio unit 110, and a request from the higher layer server 138. The PHY processing component 140 may process the received samples according to the request and provide a MAC message to the higher layer server 138. The PHY processing component 140 may generate inter-slot state data while performing the PHY processing. The inter-slot physical layer state data is to be used in a subsequent slot. Although the FAPI messages may define processing within a slot, the inter-slot state data may be valid for multiple slots. For example, a HARQ retransmission buffer may be valid until an acknowledgment has been received indicating successful transmission.

At block 520, the method 500 includes periodically transmitting the inter-slot physical layer state data to one or more other servers within a datacenter. In an example, the distributed state store component 142, e.g., in conjunction with processor 402, memory 404, and operating system 406, can periodically transmit the inter-slot physical layer state data (e.g., portions 322, 324) to one or more other servers (e.g., PHY servers 132b, 132c) within the datacenter 120. For example, the distributed state store component 142 may transmit inter-slot physical layer state data every slot. In some cases, the transmitted inter-slot physical layer state data may include only updates to the previously transmitted inter-slot physical layer state data. For instance, the updated state elements may be identified by a key so that the receiving servers may update the correct state elements.

At sub-block 522, the block 520 may optionally include partitioning the inter-slot physical layer state data into two or more portions. In an example, the distributed state store component 142 and/or the partitioning component 420, e.g., in conjunction with processor 402, memory 404, and operating system 406, can partition the inter-slot physical layer state data 320 into two or more portions 322, 324. As discussed above regarding FIG. 3, the partitioning may be hash partitioning based on the keys of the state elements. The number of portions may be based on a number of backup servers.

At sub-block 524, the block 520 may optionally include transmitting each of the two or more portions to different servers of the one or more other servers. In an example, the distributed state store component 142 and/or the state transmitting component 422, e.g., in conjunction with processor 402, memory 404, and operating system 406, can transmit each of the two or more portions 322, 324 to different servers (e.g., PHY servers 132b and 132c) of the one or more other servers 130. In an aspect, the transmitting component 422 may transmit the two or more portions 322, 324 via the wired connections 124. Because the wired connections 124 are within the datacenter 120, the transmission may be considered reliable.

At sub-block 526, the block 520 may optionally include selecting the different servers based on a current load of each of the different servers. In an example, the distributed state store component 142 and/or the state transmitting component 422, e.g., in conjunction with processor 402, memory 404, and operating system 406, can select the different servers (e.g., PHY servers 132a and 132b) based on a current load of each of the different servers. The current load of a server may be indicative of the ability of the server to maintain or update a state store and also to take over PHY processing if necessary. Accordingly, the distributed state store component 142 may select servers that are most capable of handling the state store and PHY processing.

At sub-block 528, the block 520 may optionally include performing a RDMA operation on the one or more other servers. In an example, the distributed state store component 142 and/or the state transmitting component 422, e.g., in conjunction with processor 402, memory 404, and operating system 406, can perform a RDMA operation on the one or more other servers. Because the inter-slot state data is transmitted between servers within the datacenter 120 via wired connections 124, an RDMA operation may be trusted. The RDMA operation may allow, for example, the server 132a to write directly to the memory of the server 132b with minimal processing. For example, the server 132b may merely copy contents from a packet to an indicated memory address. Accordingly, RDMA may reduce transmission costs in terms of both latency and processing in comparison to other transmission protocols.

At block 530, the method 500 optionally includes retrieving a portion of the inter-slot physical layer state data from a third server. In an example, the distributed state store component 142 and/or the state retrieving component 424, e.g., in conjunction with processor 402, memory 404, and operating system 406, can retrieve the portion of the inter-slot physical layer state data from a third server. For instance, the block 530 may be performed by the distributed state store component 142 of the PHY server 132c. For instance, the block 530 may be performed in response to a failure at the PHY server 132a or in response to a migration request.

At block 540, the method 500 optionally includes performing physical layer processing for the at least one virtualized base station at a second server of the one or more other servers based on the inter-slot physical layer state data. In an example, the distributed state store component 142 and/or the state retrieving component 424 of a second server (e.g., PHY server 132c), e.g., in conjunction with processor 402, memory 404, and operating system 406 of the second server, can perform physical layer processing for the at least one virtualized base station 305 at a second server (e.g. PHY server 132c) of the one or more other servers based on the inter-slot physical layer state data.

Figure 6:
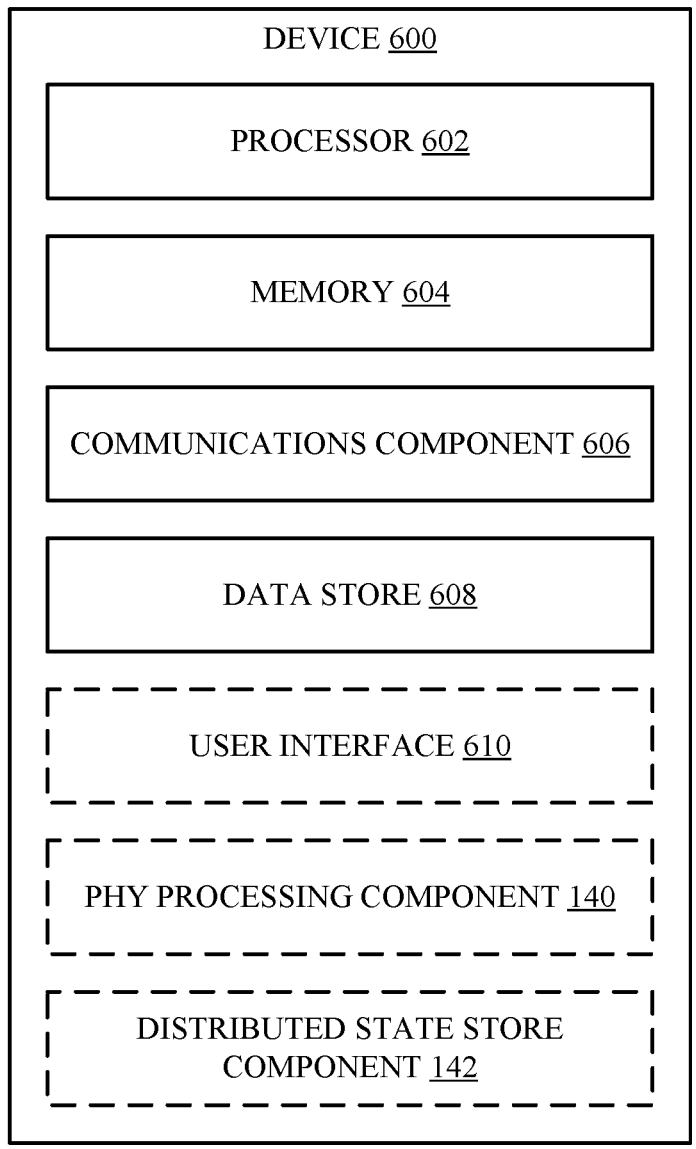
FIG. 6 is a schematic diagram of an example of a device for performing functions described herein, in accordance with aspects described herein.

FIG. 6 illustrates an example of a device 600 including additional optional component details as those shown in FIG. 4. In one aspect, device 600 may include processor 602, which may be similar to processor 402 for carrying out processing functions associated with one or more of components and functions described herein. Processor 402 can include a single or multiple set of processors or multi-core processors. Moreover, processor 602 can be implemented as an integrated processing system and/or a distributed processing system.

Device 600 may further include memory 604, which may be similar to memory 404 such as for storing local versions of operating systems (or components thereof) and/or applications being executed by processor 602, such as PHY processing component 140, distributed state store component 142, etc. Memory 604 can include a type of memory usable by a computer, such as random access memory (RAM), read only memory (ROM), tapes, magnetic discs, optical discs, volatile memory, non-volatile memory, and any combination thereof.

Further, device 600 may include a communications component 606 that provides for establishing and maintaining communications with one or more other devices, parties, entities, etc. utilizing hardware, software, and services as described herein. Communications component 606 may carry communications between components on device 600, as well as between device 600 and external devices, such as devices located across a communications network and/or devices serially or locally connected to device 600. For example, communications component 606 may include one or more buses, and may further include transmit chain components and receive chain components associated with a wireless or wired transmitter and receiver, respectively, operable for interfacing with external devices.

Additionally, device 600 may include a data store 608, which can be any suitable combination of hardware and/or software, that provides for mass storage of information, databases, and programs employed in connection with aspects described herein. For example, data store 608 may be or may include a data repository for operating systems (or components thereof), applications, related parameters, etc.) not currently being executed by processor 602. In addition, data store 608 may be a data repository for PHY processing component 140, distributed state store component 142, and/or one or more other components of the device 600.

Device 600 may optionally include a user interface component 610 operable to receive inputs from a user of device 600 and further operable to generate outputs for presentation to the user. User interface component 610 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 610 may include one or more output devices, including but not limited to a display, a speaker, a haptic feedback mechanism, a printer, any other mechanism capable of presenting an output to a user, or any combination thereof.

Device 600 may additionally include a PHY processing component 140 for generating inter-slot physical layer state data for at least one virtualized base station at a first server that performs physical layer processing for the at least one virtualized base station, a distributed state store component 142 for periodically transmitting the inter-slot physical layer state data to one or more other servers within a datacenter, etc., as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A device for a virtualized base station, comprising:
    a memory storing one or more parameters or instructions for operating a virtualized base station; and
    at least one processor coupled to the memory, wherein the at least one processor is configured to:
        generate inter-slot physical layer state data for at least one virtualized base station at a first server that performs physical layer processing for the at least one virtualized base station; and
        periodically transmit the inter-slot physical layer state data to one or more other servers within a datacenter.

2. The device of claim 1, wherein the inter-slot physical layer state data includes one or more of: hybrid automatic repeat request (HARQ) retransmission buffer data; channel state information (CSI) data, or per user equipment measurements.

3. The device of claim 1, wherein the at least one processor is configured to:
    partition the inter-slot physical layer state data into two or more portions; and
    transmit each of the two or more portions to different servers of the one or more other servers.

4. The device of claim 3, wherein the two or more portions are partitioned by user equipment.

5. The device of claim 3, wherein the at least one processor is configured to select the different servers based on a current load of each of the different servers.

6. The device of claim 1, wherein the at least one processor is configured to perform a remote direct memory access (RDMA) operation on the one or more other servers.

7. The device of claim 1, wherein the one or more other servers within the datacenter are within an edge datacenter and connected to the device via wired connections.

8. A method comprising:
    generating inter-slot physical layer state data for at least one virtualized base station at a first server that performs physical layer processing for the at least one virtualized base station; and
    periodically transmitting the inter-slot physical layer state data to one or more other servers within a datacenter.

9. The method of claim 8, wherein the inter-slot physical layer state data includes one or more of: hybrid automatic repeat request (HARM) retransmission buffer data; channel state information (CSI) data, or per user equipment measurements.

10. The method of claim 8, wherein periodically transmitting the inter-slot physical layer state data comprises:
    partitioning the inter-slot physical layer state data into two or more portions; and
    transmitting each of the two or more portions to different servers of the one or more other servers.

11. The method of claim 10, wherein the two or more portions are partitioned by user equipment.

12. The method of claim 10, wherein transmitting each of the two or more portions to different servers of the one or more other servers comprises selecting the different servers based on a current load of each of the different servers.

13. The method of claim 8, wherein periodically transmitting the inter-slot physical layer state data comprises performing a remote direct memory access (RDMA) operation on the one or more other servers.

14. The method of claim 8, wherein the one or more other servers within the datacenter are within an edge datacenter and connected via wired connections.

15. The method of claim 8, further comprising performing physical layer processing for the at least one virtualized base station at a second server of the one or more other servers based on the inter-slot physical layer state data.

16. The method of claim 15, further comprising retrieving a portion of the inter-slot physical layer state data from a third server prior to performing the physical layer processing.

17. The method of claim 15, wherein performing the physical layer processing at the second server is in response to a fault at the first server.

18. A datacenter for operating virtualized base stations, comprising:
    a plurality of servers for performing physical layer processing, each respective server comprising:
        a memory storing one or more parameters or instructions for operating a virtualize base station; and
        at least one processor coupled to the memory, wherein the at least one processor is configured to:
            perform physical layer processing for at least one virtualized base station;
            generate inter-slot physical layer state data for the at least one virtualized base station; and
            periodically transmit the inter-slot physical layer state data to one or more other servers of the plurality of servers within the datacenter.

19. The datacenter of claim 18, wherein a second server of the plurality of servers is configured to perform physical layer processing for the at least one virtualized base station based on the inter-slot physical layer state data.

20. The datacenter of claim 19, wherein the second server of the plurality of servers is configured to retrieve a portion of the inter-slot physical layer state data from a third server prior to performing the physical layer processing.

* * * * *